(12) United States Patent
Ito

(10) Patent No.: US 7,855,971 B2
(45) Date of Patent: Dec. 21, 2010

(54) INTERFACE DEVICE AND TOPOLOGY FORMATION METHOD

(75) Inventor: Makoto Ito, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 316 days.

(21) Appl. No.: 11/905,372

(22) Filed: Sep. 28, 2007

(65) Prior Publication Data

US 2008/0080490 A1    Apr. 3, 2008

(30) Foreign Application Priority Data

Sep. 28, 2006   (JP)   .............. 2006-265236

(51) Int. Cl.
*G01R 31/08*   (2006.01)
(52) U.S. Cl. ...................... 370/249; 370/242
(58) Field of Classification Search ............. 370/362, 370/244, 389, 242, 243, 245, 248, 249, 463; 710/311
See application file for complete search history.

(56) References Cited

U.S. PATENT DOCUMENTS

| | | | |
|---|---|---|---|
| 6,279,060 B1 * | 8/2001 | Luke et al. ................. | 710/64 |
| 6,654,353 B1 * | 11/2003 | Tokura et al. .............. | 370/254 |
| 2003/0021235 A1 * | 1/2003 | Arima ....................... | 370/244 |

FOREIGN PATENT DOCUMENTS

JP    2003-37613    2/2003

* cited by examiner

*Primary Examiner*—Ricky Ngo
*Assistant Examiner*—Christine Ng
(74) *Attorney, Agent, or Firm*—Fujitsu Patent Center

(57) ABSTRACT

When a loop connection associated with a port is detected while the port is in an Untested state ST3, a state machine corresponding to the port shifts from the state ST3 to a Loop_disabled state ST4. The state machine then shifts from state ST4 to a Sleep1 state ST5 while maintaining a Loop_disabled value set at 1. When the state machine in state ST5 detects a bus reset, the state machine shifts from state ST5 to state ST4. Subsequently, the bus reset detection further shifts the state machine from state ST4 to state ST3.

12 Claims, 9 Drawing Sheets

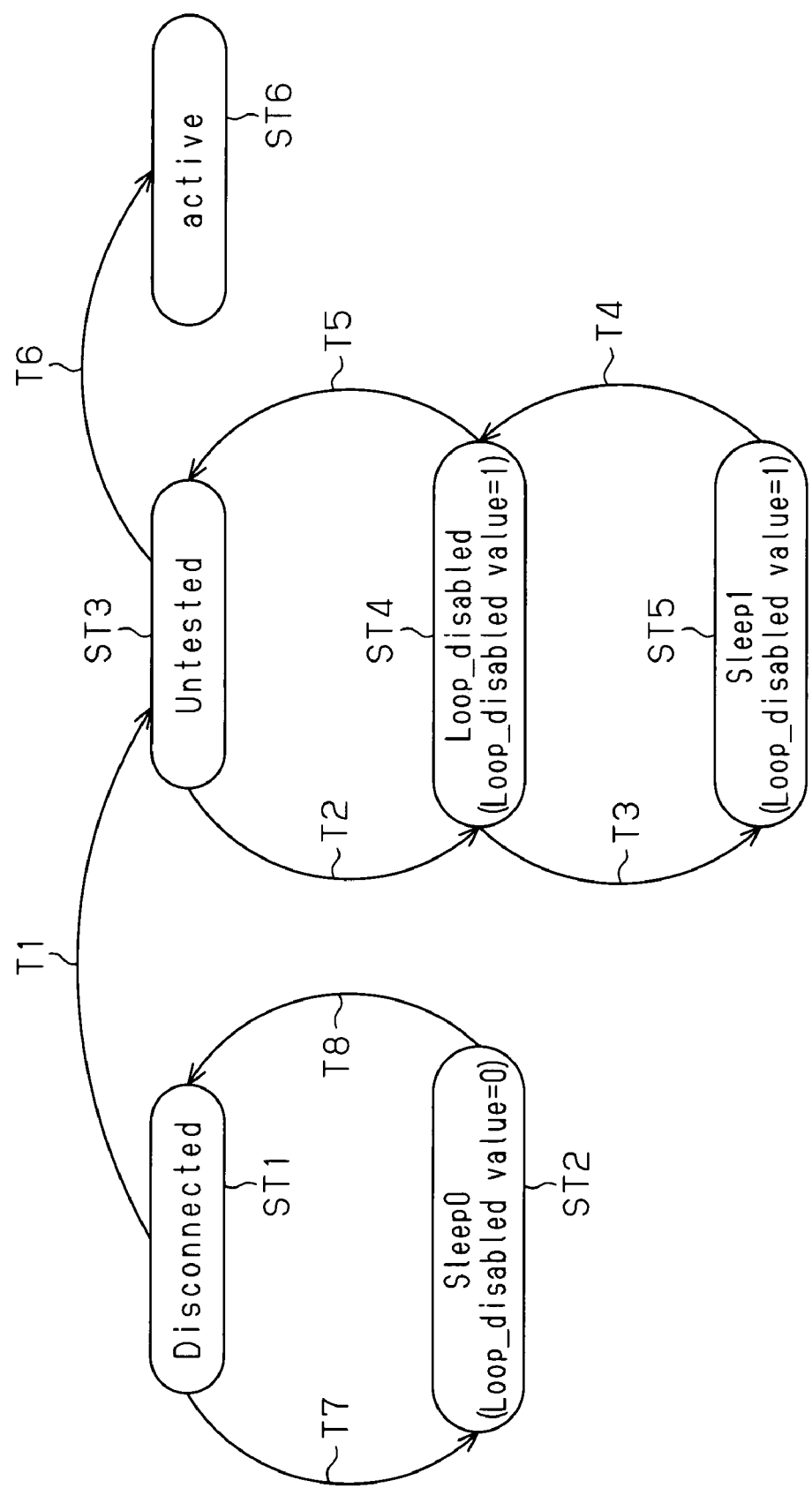

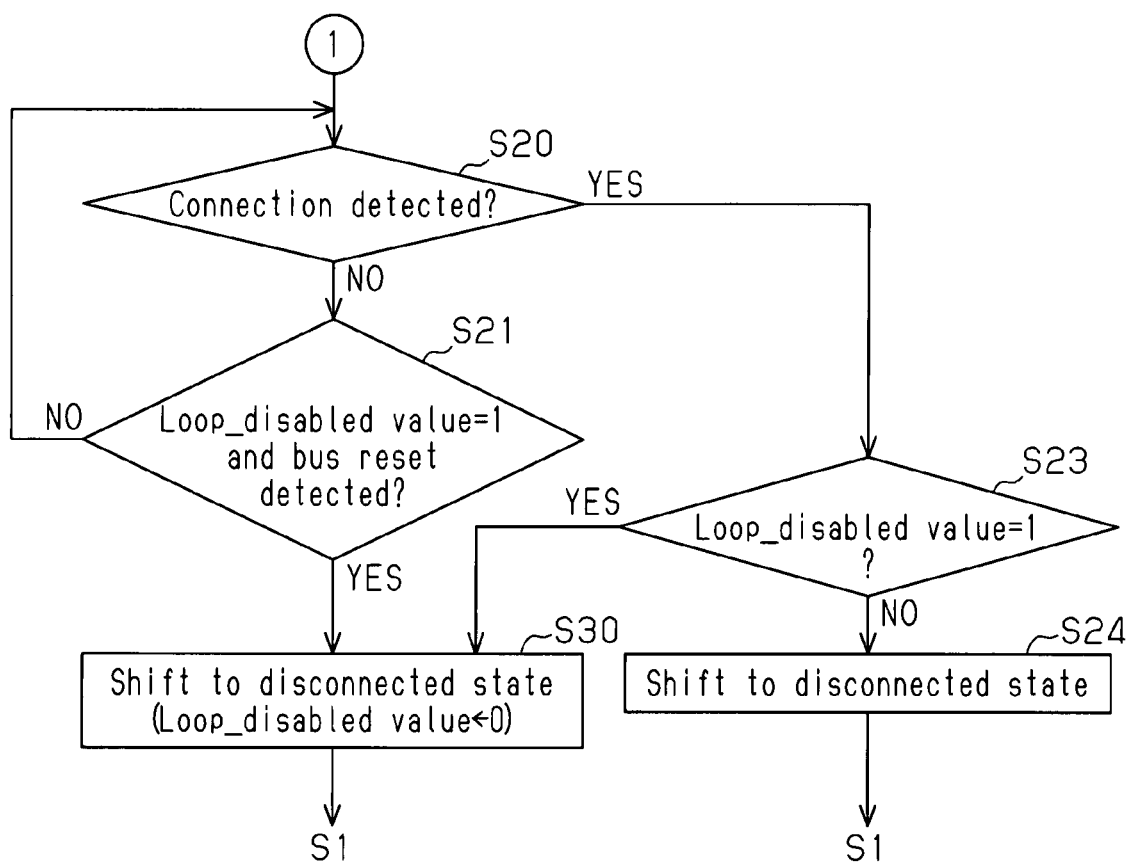

INTERFACE DEVICE AND TOPOLOGY FORMATION METHOD

CROSS-REFERENCE TO RELATED APPLICATIONS

This application is based upon and claims the benefit of priority from prior Japanese Patent Application No. 2006-265236, filed on Sep. 28, 2006, the entire contents of which are incorporated herein by reference.

BACKGROUND

1. Field

The embodiments described below relate to an interface device and a topology formation method.

2. Description of the Related Art

The amount of electronic devices installed in automobiles has drastically increased in recent years. Various functions have accordingly been added to automotive LANs. This has resulted in a demand for an automotive information LAN that operates at high-speeds and high-frequency bands so that high-quality digital videos and audio content can be enjoyed in automobiles. A standard referred to as 1394-Automotive, or IDB-1394, is now receiving attention as one solution to such an automotive information LAN that connects automotive multimedia devices.

The rapid progress of electronics in automobiles has resulted in the development of IDB-1394, which is an automotive serial interface based on IEEE-1394b. An IDB-1394 network has a high transmission frequency band to enable multiplex transmission of digital video streams and is suitable for an automotive multimedia network that performs multiplex transmission of video and audio data. An IDB-1394 information LAN enables high-quality digital contents of video provided by digital television (DTV) or DVD-Video and music provided by DVD-Audio to be appreciated in an automobile. This technology is also applicable to a rear-seat entertainment system, with which a video that differs from that watched in the front seat can be watched from the rear seat.

An IDB-1394 interface circuit is powered by a battery mounted on the automobile. To reduce power consumption of the interface circuit, when a bus cable is carrying no signals, an IDB-1394 circuit automatically shifts the ports connected to the bus cable to a low power consumption state (or a sleep state).

The IDB-1394 standard is based on the IEEE-1394b standard, which does not permit loop connections. With the IEEE-1394b standard, a loop test for detecting a loop connection is conducted. Japanese Laid-Open Patent Publication No. 2003-37613 describes the dissolving of a detected loop connection by, for example, logically disconnecting the final bus cable that has been connected to form the loop (bus cable 1c in the example of FIG. 1A). More specifically, the detected loop connection is changed to a daisy-chain connection by shifting a port P2B of a node 2 and a port P1C of a node 3 connected to the bus cable 1c to a Loop_disabled state, in which the ports P2B and P1C are logically disconnected.

SUMMARY

The embodiments described below provide that an interface device including a plurality of ports connectable to a port of a further node via a bus cable, and a plurality of state machines corresponding to the plurality of ports. Each of the state machines logically disconnects the corresponding port from a network by shifting the corresponding port to a logically disconnected state in response to detection of a loop associated with the corresponding port and then shifts the corresponding port to a low power consumption state, and shifts the corresponding port from the low power consumption state to a non-low power consumption state when detecting a bus reset of the network while the corresponding port is in the low power consumption state.

BRIEF DESCRIPTION OF THE DRAWINGS

The embodiments, together with objects and advantages thereof, may best be understood by reference to the following description together with the accompanying drawings in which:

FIG. 4 is a diagram showing the shifting of connection states in one embodiment;

FIG. 9 is a flowchart showing a topology formation method of another embodiment.

DETAILED DESCRIPTION OF THE PREFERRED EMBODIMENTS

One embodiment will now be described with reference to FIGS. 2 to 7.

Figure 2:
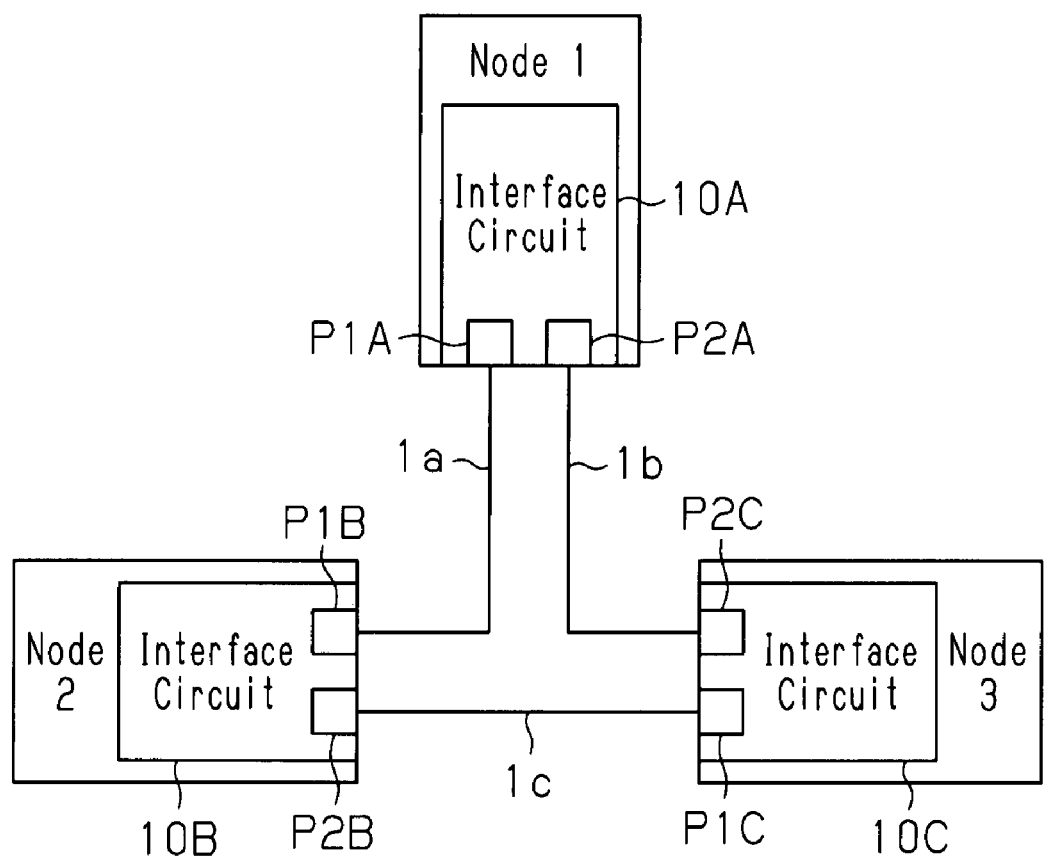
FIG. 2 is a block diagram showing a network system according to one embodiment.

FIG. 2 shows a network system that performs data transfer in compliance with IDB-1394, which is an automotive version of the serial interface specification.

The network system includes a plurality of (three in one embodiment) nodes 1, 2, and 3. The node 1 includes an interface circuit 10A. The interface circuit 10A includes a plurality of ports including a first port P1A and a second port P2A. The node 2 includes an interface circuit 10B. The interface circuit 10B includes a plurality of ports including a first port P1B and a second port P2B. The node 3 includes an interface circuit 10C. The interface circuit 10C includes a plurality of ports including a first port P1C and a second port P2C.

The first port P1A of the node 1 is connected to the first port P1B of the node 2 by an IDB-1394 bus cable 1a. The second port P2A of the node 1 is connected to the second port P2C of the node 3 by a bus cable 1b. The second port P2B of the node 2 is connected to the first port P1C of the node 3 by a bus cable 1c. The topology of the network system includes a loop that is formed by the nodes 1 to 3 and the bus cables 1a to 1c.

The nodes 1 to 3 may be, for example, network-applicable devices such as a front display, a rear display, and a DVD playback apparatus.

Figure 3:
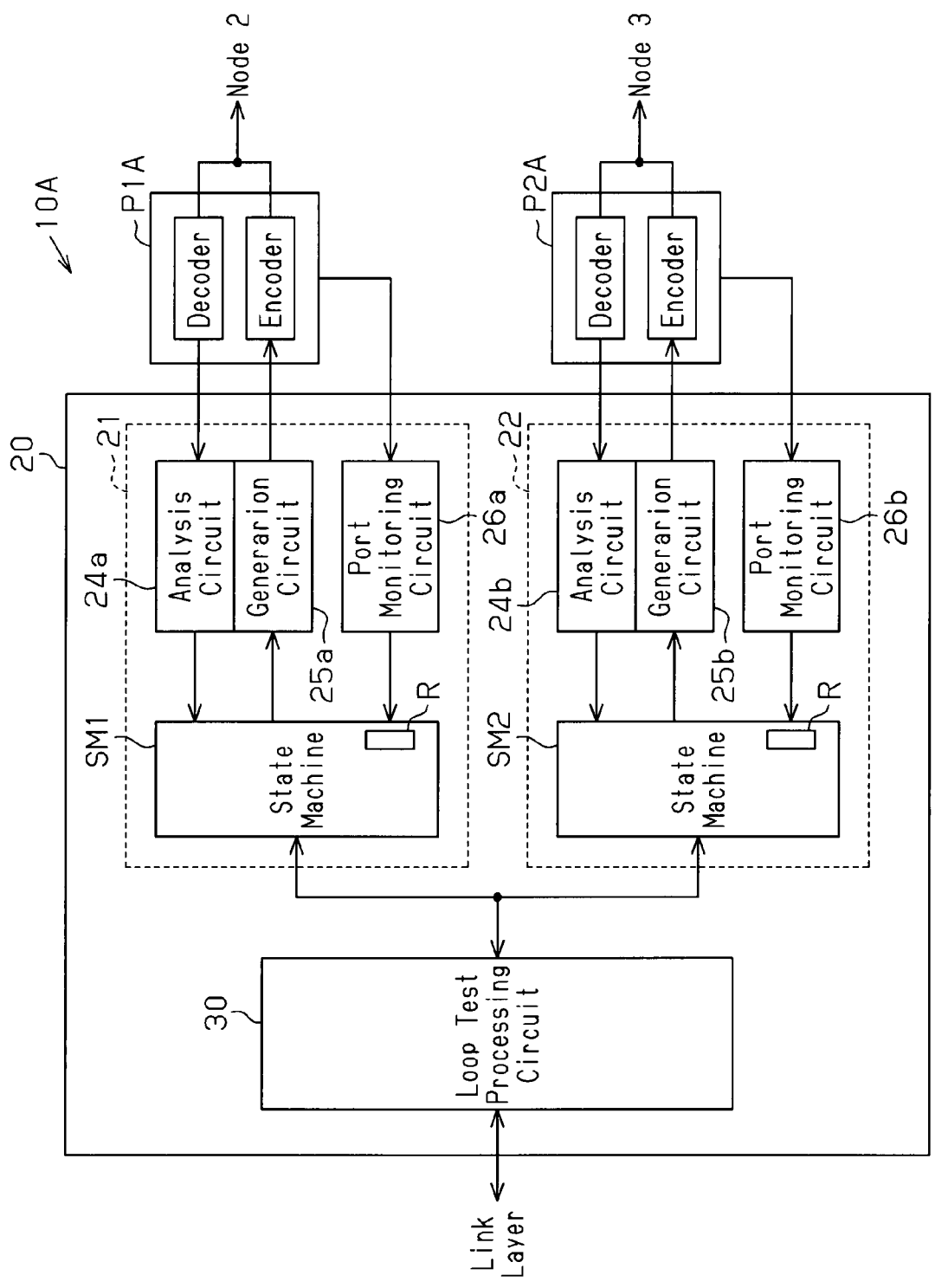
FIG. 3 is a block diagram showing an interface circuit of one embodiment.

The interface circuit 10A of the node 1 will now be described with reference to FIG. 3.

The interface circuit 10A includes the first port P1A, the second port P2A, and a physical layer processing circuit 20. The first port P1A is connected to the first port P1B of the node 2 by the bus cable 1a. The second port P2A is connected to the second port P2C of the node 3 by the bus cable 1b. Each of the first and second ports P1A and P2A includes a decoder and an encoder. The decoders convert electric signals received via the bus cables 1a and 1b to electric signals processable in the node 1 and output the electric signals to the physical layer processing circuit 20. The encoders convert the electric signals processed in the node 1 into IDB-1394 electric signals and output the electric signals to other nodes.

The physical layer processing circuit 20 includes a first data transfer control circuit 21, which is connected to the first port P1A, a second data transfer control circuit 22, which is connected to the second port P2A, and a loop test processing circuit 30. The first data transfer control circuit 21 and the second data transfer control circuit 22 have the same structure. Thus, only the first data transfer control circuit 21 will be described, and the second data transfer control circuit 22 will not be described in detail.

The first data transfer control circuit 21 includes an analysis circuit 24a, which is connected to the decoder of the first port P1A, a generation circuit 25a, which is connected to the encoder of the first port P1A, a port monitoring circuit 26a, which is connected to the first port P1A, and a state machine SM1, which is connected to the circuits 24a, 25a, and 26a.

The analysis circuit 24a receives either a data packet or a loop test signal from the decoder of the first port P1A. When receiving a data packet, the analysis circuit 24a outputs the received data packet directly to the state machine SM1. A loop test signal is issued when a loop test for detecting a loop connection is executed. When the node 1 receives a loop test signal and is not transmitting a loop test signal, the analysis circuit 24a directly outputs the received loop test signal to the state machine SM1.

When the node 1 is transmitting a loop test signal as it also receives a loop test signal, the analysis circuit 24a compares the received loop test with the transmitted loop test. Then, the node outputs the result of the comparison to the state machine SM1. For example, the analysis circuit 24a outputs a loop-detected signal to the state machine SM1 when the received loop test signal and the transmitted loop test signal are identical to each other. The analysis circuit 24a outputs a loop-undetected signal to the state machine SM1 when the received loop test signal and the transmitted loop test signals are not identical to each other. The analysis circuit 24a also outputs a loop-undetected signal to the state machine SM1 if a loop test signal is not received when a predetermined time elapses after the loop test is started.

The generation circuit 25a receives a data packet or a loop test signal, which is input from the state machine SM1, and outputs the received data packet or loop test signal directly to the encoder of the first port P1A. During execution of the loop test, the loop test processing circuit 30 provides the generation circuit 25a with an instruction signal for generating a loop test signal. The generation circuit 25a generates a loop test signal based on the instruction signal and outputs the loop test signal to the first port P1A.

The port monitoring circuit 26a monitors the state (e.g., connection state) of the first port P1A and provides the state machine SM1 with an output when the state of the first port P1A changes.

The state machine SM1 receives a data packet or a loop test signal from the first port P1A via the analysis circuit 24a during data reception. The state machine SM1 outputs the data packet input from the first port P1A to a link layer. When the second port P2A, which is separate from the first port P1A, is connected to the node 3, the state machine SM1 transmits the data packet or the loop test signal input from the first port P1A to the node 3, which is connected to the second port P2A, via the second data transfer control circuit 22 and the second port P2A.

The state machine SM1 receives a data packet from the link layer during data transfer. The state machine SM1 outputs the data packet of the link layer from the first port P1A via the generation circuit 25a.

The state machine SM1 shifts to various states in accordance with state shifting conditions. For example, the state machine SM1 shifts states based on comparison results input from the analysis circuit 24a.

The loop test processing circuit 30 outputs an instruction signal for generating a loop test signal to the generation circuit 25a via the state machine SM1 during execution of a loop test.

FIG. 4 is a diagram showing the shifting of states in the state machine SM1. The state machine SM1 shifts between states ST1 to ST6. State ST1 is referred to as a "Disconnected" state. When the state machine SM1 is in state ST1, the corresponding first port P1A is not physically connected (by a bus cable) to the port of another node (e.g., the first port P1B of the node 2). State ST2 is referred to as a "Sleep0" state (in which a Loop_disabled value is 0). When the state machine SM1 is in state ST2, the corresponding first port P1A stops transmitting and receiving a tone signal. State ST2 is a low power consumption mode. In state ST2, a loop disabled value (Loop_disabled value), which will be described later, is 0. State ST3 is referred to as an "Untested" state. When the state machine SM1 is in state ST3, the corresponding first port P1A is physically connected to the port of another node and is in a data transfer preparation state. State ST4 is referred to as a "Loop_disabled" state. When the state machine SM1 is in state ST4, the corresponding first port P1A is physically connected to but logically disconnected from the port of another node. State ST5 is referred to as a "Sleep1" state (in which the Loop_disabled value is 1). When the state machine SM1 is in state ST5, the corresponding first port P1A is in a low power consumption mode after having been shifted to the Loop_disabled state. In state ST5, the Loop_disabled value is set at 1 (predetermined value). State ST6 is referred to as an "active" state. When the state machine SM1 is in state ST6, the corresponding first port P1A is in a data transfer enabled state. States ST2 and ST5 are examples of low power consumption states. States other than states ST2 and ST5 are examples of non-low power consumption states.

The shifting of states in the state machine SM1 will now be described.

If the first port P1A is connected to the port of another node when the state machine SM1 is in the Disconnected state ST1 (state shifting condition T1), the state machine SM1 shifts from state ST1 to the Untested state ST3.

If a loop is detected in the loop test when the state machine SM1 is in state ST3 and the first port P1A is the final port that has been physically connected to form the loop (state shifting condition T2), the state machine SM1 shifts from state ST3 to the Loop_disabled state ST4. Further, the state machine SM1 sets the Loop_disabled value stored in its register R to 1. The Loop_disabled value when set at 1 indicates that the corresponding port is logically disconnected.

The state machine SM1 that has shifted to state ST4 further shifts from state ST4 to the Sleep1 state ST5 while maintaining the Loop_disabled value at 1 (state shifting condition T3).

If a bus reset is detected when the state machine SM1 is in state ST5 (state shifting condition T4), the state machine SM1 shifts from state ST5 to the Loop_disabled state ST4. If a bus reset is detected when the state machine SM1 is in state ST4 (state shifting condition T5), the state machine SM1 shifts from state ST4 to the Untested state ST3 and resets the Loop_disabled value stored in the register R to 0. The bus reset may be the same as the bus reset detected when the state machine SM1 shifts from state ST4 to state ST5.

If a loop is not detected at the node 1 when the state machine SM1 is in state ST3 (state shifting condition T6), the state machine SM1 shifts from state ST3 to the active state ST6.

When the state machine SM1 is in the Disconnected state ST1 and does not detect a connected subject within a predetermined time (state shifting condition T7), the state machine SM1 shifts from state ST1 to the Sleep0 state ST2. In this state, the Loop_disabled value stored in the register R is 0. When a bus cable that is connected to the port of another node is connected to the first port P1A (state shifting condition T8), the state machine SM1 shifts from state ST2 to state ST1.

The state machine SM1 controls the state of the corresponding first port P1A by shifting its state in accordance with the state shifting conditions. In other words, the shifting of the state of the state machine SM1 is equivalent to the shifting of the state of the first port P1A.

For example, the state machine SM1 shifts to the Loop_disabled state ST4 so that the first port P1A stops transmitting and receiving a data packet and a loop test signal. This logically disconnects the first port P1A. The state machine SM1 shifts to the Sleep1 state ST5 so that the first port P1A stops transmitting and receiving tone signals and shifts to the low power consumption mode.

The interface circuits 10B and 10C of the nodes 2 and 3 have the same structure as the interface circuit 10A of the node 1 and thus will not be described.

The state shifting of the state machines SM1 and SM2 in each of the nodes 1 to 3, that is, the state shifting of the corresponding ports, will now be described with reference to FIGS. 5 to 7.

Figure 5A:
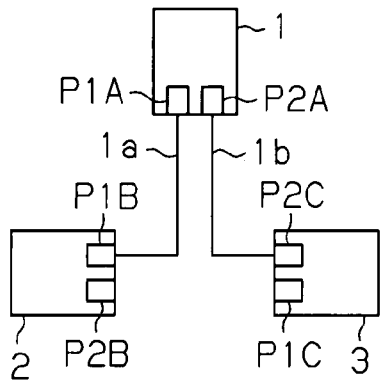
FIGS. 5A to 5E are diagrams describing the shifting of connection states in the network system of one embodiment.
Figure 6:
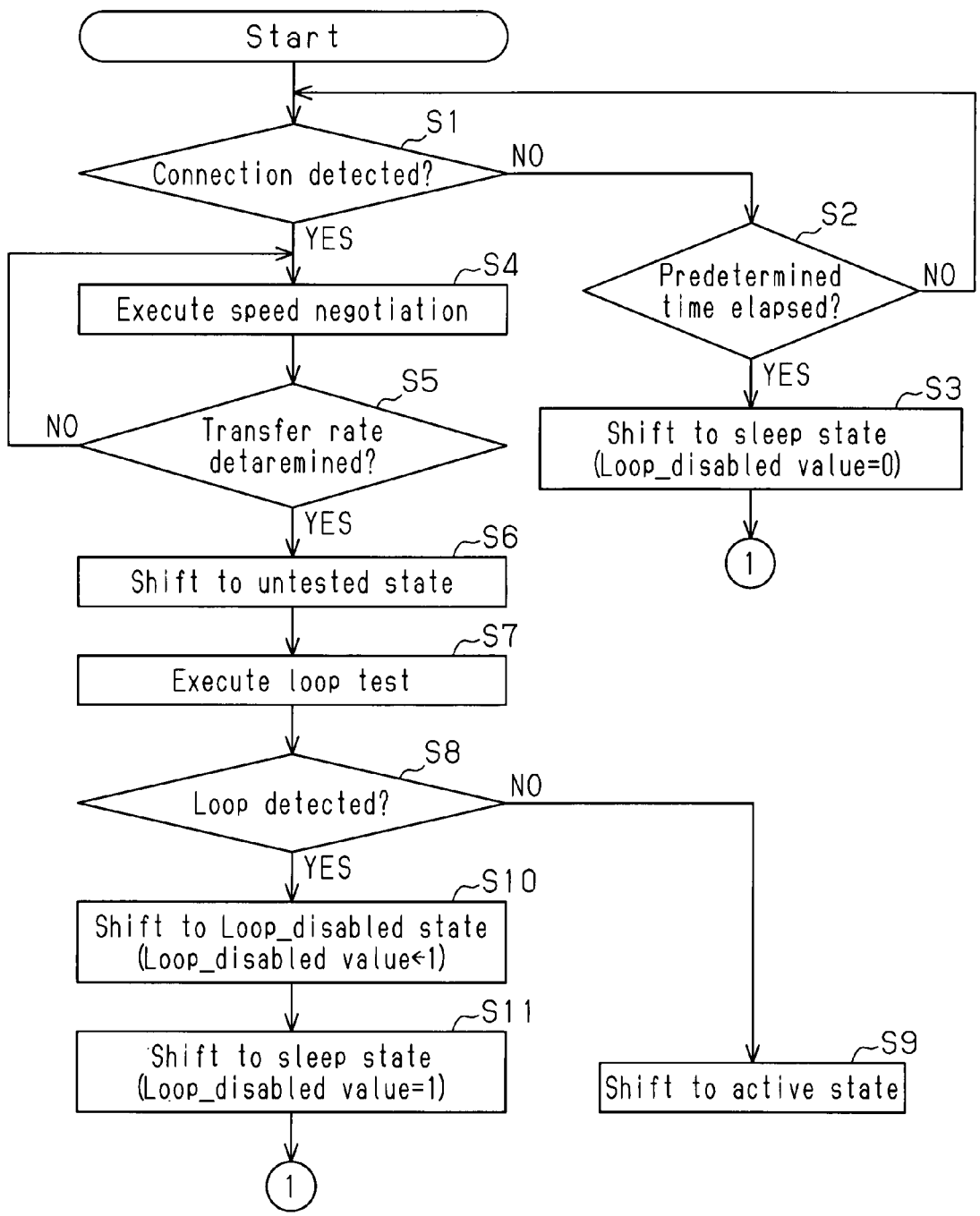
FIGS. 6 and 7 are flowcharts showing a topology formation method of one embodiment.

FIG. 5A shows the network system of one embodiment in an initial state. In the topology shown in FIG. 5A of the initial state, the port P1A of the node 1 and the port P1B of the node 2 are connected by the bus cable 1a, and the port P2A of the node 1 and the port P2C of the node 3 are connected by the bus cable 1b. The port P2B of the node 2 and the port P1C of the node 3 are not connected by any bus cable.

A case in which the network system forming the topology shown in FIG. 5A shifts from the state shown in FIG. 5B to the state shown in FIG. 5E will now be described with reference to FIGS. 6 and 7.

In step S1, the state machines SM1 and SM2 of each of the nodes 1, 2, and 3 determine whether a bus cable has been newly connected. More specifically, the state machines SM1 and SM2 determine whether a bus cable has been newly connected to the second port P2B or the first port P1C of the nodes 2 and 3. When the state machines SM1 and SM2 determine that a bus cable has not been connected to the second port P2B and the first port P1C, the processing proceeds to step S2. In step S2, the state machines SM1 and SM2 determine whether a predetermined time has elapsed. When the state machines SM1 and SM2 determine that the predetermined time has elapsed, the processing proceeds to step S3. In step S3, the state machines SM2 and SM1 that are connected to the second port P2B and the first port P1C shift from the Disconnected state to the Sleep0 state. The processing then proceeds to the flowchart of FIG. 7. When the state machines SM1 and SM2 determine that the predetermined time has not yet elapsed in step S2, the processing returns to step S1.

Figure 5B:
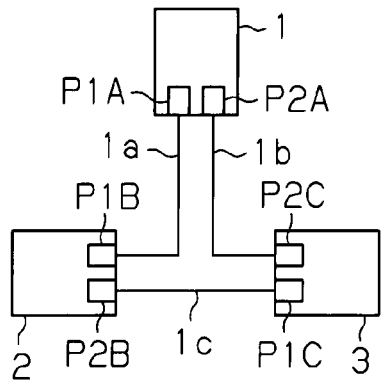
Figure 5C:
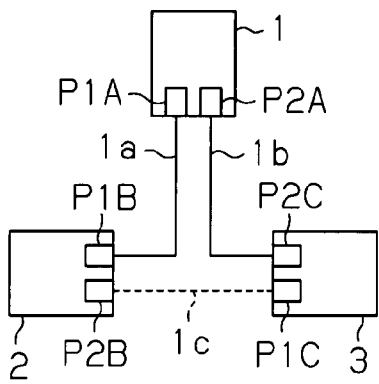

In step S1, when the port P2B and the port P1C are connected to each other by the bus cable 1c as shown in FIG. 5B, the state machines SM1 and SM2 detect the connection. In this case, the processing then proceeds to step S4. In step S4, the nodes 1 to 3 execute speed negotiation between the ports and determine the optimum transfer rate, that is, the maximum transfer rate at which transfer is possible between the nodes. In step S5, the state machines SM1 and SM2 determine whether the speed negotiation has been completed. The processing returns to step S4 until the speed negotiation is completed. When the speed negotiation is completed and the optimum transfer rate is determined in step S5, the processing proceeds to step S6.

In step S6, the state machines SM1 and SM2 first perform arbitration to determine the node that is to transfer a packet. In this example, it is assumed that the node 2 is the winner of the arbitration.

In step S6, state machines corresponding to ports connected to a bus cable shift from the Disconnected state to the Untested state. The processing then proceeds to step S7.

In step S7, the nodes 1 to 3 execute the loop test to determine whether the network system forms a loop. The loop test is a test for determining the formation of a loop when the node winning the arbitration outputs a loop test signal and the loop test signal returns to the node.

The loop test executed in one embodiment will now be described. The loop test processing circuit 30 of the node winning the arbitration (node 2 in one embodiment) outputs an instruction signal for generating a loop test signal to one of its state machines (e.g., the state machine SM1). The state machine SM1 outputs the instruction signal to the generation circuit 25a. The generation circuit 25a generates a loop test signal based on the input instruction signal and transmits the loop test signal from the first port P1B to the first port P1A of the node 1.

The loop test signal is input into the first port P1A of the node 1 through the bus cable 1a. The first port P1A outputs the received loop test signal to the state machine SM1 of the first data transfer control circuit 21. Since a bus cable is connected to the other port (the second port P2A), the state machine SM1 outputs the input loop test signal to the state machine SM2. The state machine SM2 transmits the loop test signal from the second port P2A to the second port P2C of the node 3 via the generation circuit 25b.

The loop test signal is input into the second port P2C of the node 3 through the bus cable 1b. The second port P2C outputs the received loop test signal to the state machine SM2 of the second data transfer control circuit 22. Since a bus cable is connected to the other port (the first port P1C), the state machine SM2 outputs the input loop test signal to the other state machine SM1. The state machine SM1 transmits the loop test signal from the first port P1C to the second port P2B of the node 2 via the generation circuit 25a.

The loop test signal is input into the second port P2B of the node 2 through the bus cable 1c. The second port P2B outputs the received loop test signal to the analysis circuit 24b. The analysis circuit 24b of the node 2 that has transmitted the loop test signal compares the transmitted loop test signal with the received loop test signal. The analysis circuit 24b then outputs a signal indicating that a loop has been detected to the state machine SM2 when the transmitted loop test signal and the received loop test signal are identical to each other like in this example. The analysis circuit 24b outputs a signal indicating that a loop has not been detected to the state machine SM2 when the transmitted loop test signal and the received loop test signal are not identical to each other. The analysis circuit 24b also outputs a signal indicating that a loop has not been detected to the state machine SM2 when receiving a loop test signal is not received within a predetermined time from when the loop test is started. The state machine SM2 of the node 2 outputs a signal indicating whether a loop has been detected to the state machine SM1 of the node 3 based on the signal input from the analysis circuit 24b.

In step S8, when a loop is not detected in the loop test, the processing proceeds to step S9. In step S9, the state machines SM1 and SM2 of each of the nodes 1 to 3 shift the corresponding ports to the active state when a bus cable is connected to the corresponding ports.

In step S8, when a loop is detected in the loop test, the processing proceeds to step S10. In step S10, the state machines connected to the ports that are connected to the finally connected bus cable in the network system, or the bus cable that has completed the loop, shift from the Untested state to the Loop_disabled state. In one embodiment, the state machines SM2 and SM1 that are connected to the second port P2B of the node 2 and the first port P1C of the node 3, which are connected to the finally connected bus cable 1c, shift to the Loop_disabled state. Further, these state machines set the Loop_disabled values stored in their registers R to 1, which indicates that the corresponding ports are logically disconnected. This logically disconnects the ports P2B and P1C (the bus cable 1c). As indicated by the broken line in FIG. 5C, the port P2B of the node 2 and the port P1C of the node 3 stop exchanging data packets and loop test signals. Although the bus cable 1c connects the ports P2B and P1C, the bus cable 1c is logically disconnected and thus does not function. As a result, the network system shown in FIG. 5C forms a daisy-chain topology.

In step S11, the state machines shifted to the Loop_disabled state further shifts to the Sleep1 state while keeping the Loop_disabled values set at 1. The processing then proceeds to the flowchart shown in FIG. 7. More specifically, when the state machines SM1 and SM2 shift from the Untested state ST3 to the Loop_disabled state ST4 (state shifting condition T2), the state machines SM1 and SM2 further shift from state ST4 to the Sleep1 state ST5. In the Loop_disabled state, the ports transmit a tone signal for recognizing that each node has been connected. The ports do not transmit a tone signal in the Sleep1 (Sleep0) state. Thus, the port P2B of the node 2 and the port P1C of the node 3 consume less power in the Sleep1 (Sleep0) state than in the Loop_disabled state.

Figure 7:
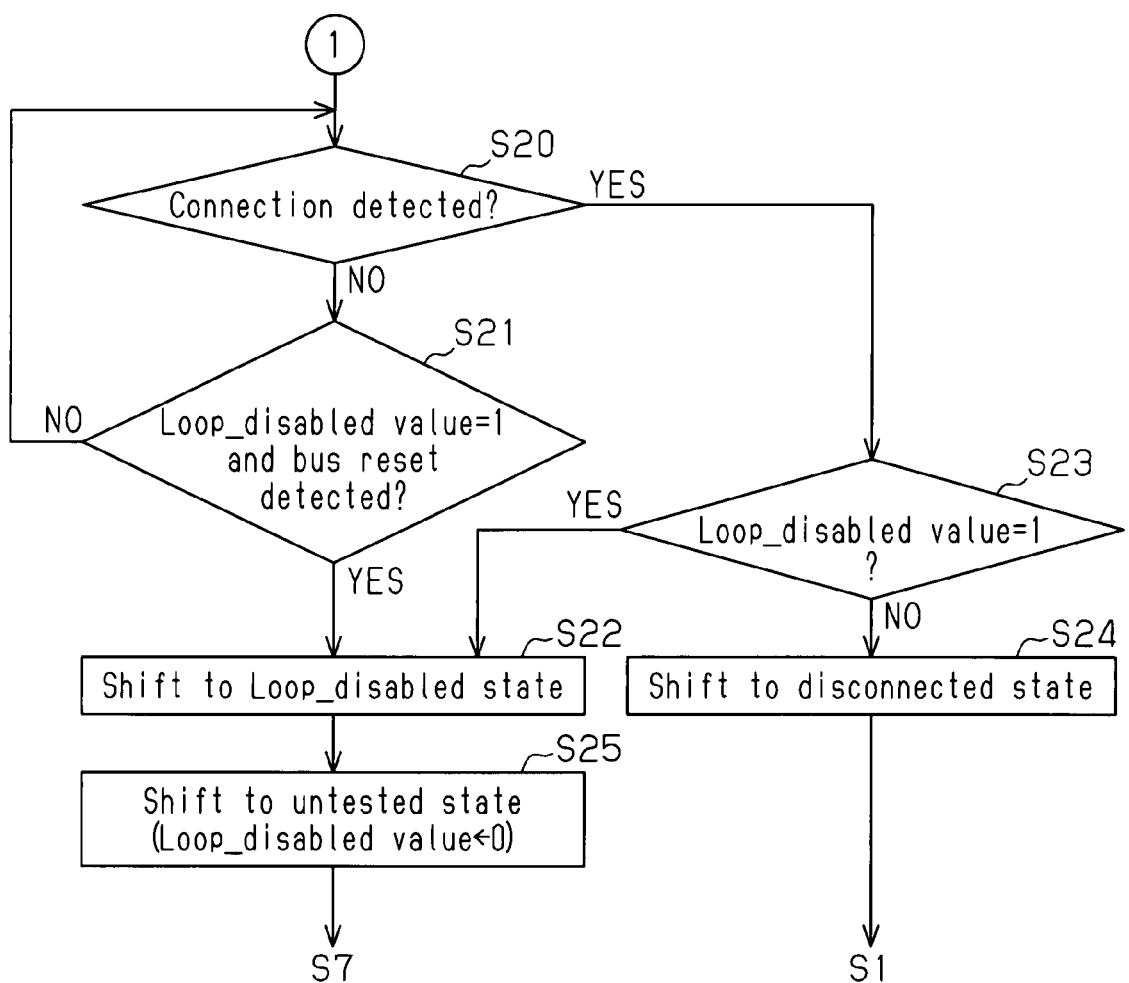

In step S20 shown in FIG. 7, the state machines SM1 and SM2 of each of the nodes 1 to 3 determine whether the network system includes a new physical connection. When the state machines SM1 and SM2 determine that the network system does not include any new physical connection, the processing proceeds to step S21. In the network system in the state shown in FIG. 5C, all the ports have been already connected to one another by the bus cables 1a to 1c. Thus, the state machines do not detect any new physical connection. In this case, the processing proceeds to step S21.

In step S21, the state machines SM1 and SM2 of each of the nodes 1 to 3 determine whether the Loop_disabled values stored in their registers R are 1 and whether a bus reset has been detected. When the Loop_disabled values are 0 (Sleep0 state) or when a bus reset has not been detected, the processing returns to step S20.

Figure 5D:
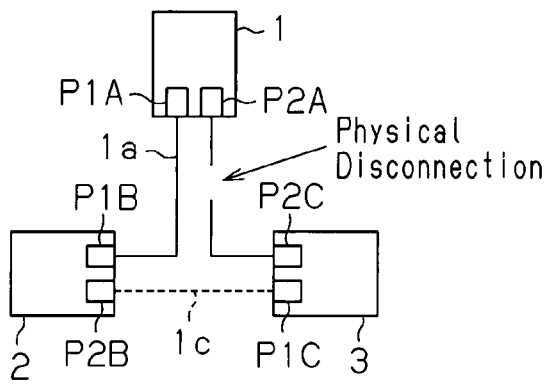
Figure 5E:
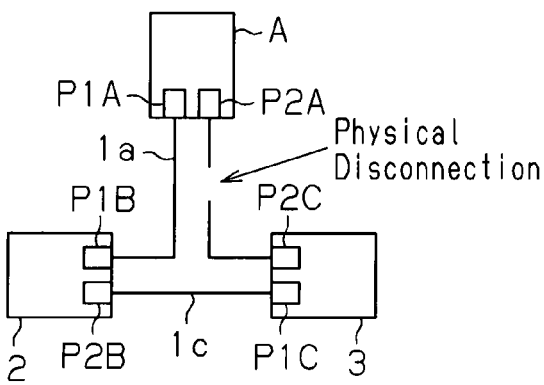

For example, as shown in FIG. 5D, excluding the bus cable 1c that has been logically disconnected in step S10, when one of the bus cables 1a to 1c that form a loop, for example, the bus cable 1b, is physically disconnected for one reason or another, the topology of the network system changes and a bus reset occurs. The state machines connected to the second port P2B of the node 2 and the first port P1C of the node 3, which are connected to the bus cable 1c that has been logically disconnected in step S10, have Loop_disabled values of 1. Thus, the state machines determine that the Loop_disabled values are 1 (Sleep1 state) and that a bus reset has been detected. The processing then proceeds to step S22.

In step S20, when the state machines detect a new physical connection, the processing proceeds to step S23. In step S23, the state machines determine whether the Loop_disabled values stored in their registers R are 1. When the state machines determine that the Loop_disabled values are not 1, that is, the Loop_disabled values are 0, the processing proceeds to step S24. In FIG. 5A, for example, if the bus cable 1c is newly connected to the second port P2B of the node 2 and the first port P1C of the node 3 when the state machines connected to the ports P2B and P1C are in the Sleep0 state (in which the Loop_disabled value is 0) (state shifting condition T8), the processing proceeds to step S24. In step S24, the state machines connected to the ports P2B and P1C shift to the Disconnected state. The processing then returns to step S1.

In step S23, when the state machines determine that the Loop_disabled values are 1, the processing proceeds to step S22. For example, when the topology changes from the state shown in FIG. 5C to the state shown in FIG. 5D, a bus reset occurs. In this case, the state machine SM1 connected to the first port P1C of the node 3 and the state machine SM2 connected to the second port P2B of the node 2 receive notification of the bus reset at different timings due to a difference in the transfer speed of the bus reset notification between the state machines SM1 and SM2. This causes the state machine SM2 to proceed to step S22 before the state machine SM2. As a result, the second port P2B of the node 2 detects the connection before detecting the bus reset. Thus, the state machine connected to the second port P2B of the node 2 first proceeds to step S23 and then proceeds to step S22.

In step S22, the state machines connected to the second port P2B of the node 2 and the first port P1C of the node 3 that are in the Sleep1 state shift to the Loop_disabled state. The processing then proceeds to step S25. More specifically, when the network system includes state machines (ports) that are in the Sleep1 state ST5 and a bus reset has been detected (state shifting condition T4), the state machines in the Sleep state ST5 shift to the Loop_disabled state ST4.

In step S25, the state machines that have shifted from the Sleep1 state to the Loop_disabled state in step S22 (state machines connected to the ports P2B and P1C) shift to the Untested state based on a bus reset detected when the processing proceeds to step S22. The processing then proceeds to step S7. Further, these state machines reset the Loop_disabled values stored in their registers R to 0. As a result, when, for example, the processing proceeds from step S21 to step S22, the logical disconnection of the bus cable 1c is cancelled and the second port P2B of the node 2 and the first port P1C of the node 3 are logically reconnected to each other automatically as shown in FIG. 5E. This prevents the node 3 from being disconnected from the nodes 1 and 2.

One embodiment has the advantages described below.

(1) One embodiment additionally uses the state shifting condition T4 for shifting from the Sleep1 state ST5 to the Loop_disabled state ST4. The state shifting condition T4 enables the state machines SM1 and SM2 to shift from the Sleep1 state ST5 to the Loop_disabled state ST4 when a bus reset occurs. The state machines that have shifted from the Sleep1 state ST5 to the Loop_disabled state ST4 shift to the Untested state ST3 based on the existing state shifting condition T5. This cancels the logical disconnection of the ports connected to the state machines. Thus, the state shifting conditions of one embodiment eliminate the need to switch off the power supply to logically reconnect the state machines (ports) that have once been shifted to the Sleep state, or more specifically to shift the state machines to the Untested state ST3, in which the logical disconnection is cancelled. As a result, when, for example, a bus cable forming a loop is disconnected for one reason or another, the logical disconnection of the logically disconnected ports, which have been shifted to the Sleep1 state, is automatically cancelled. As a result, these ports (e.g., the ports P2A and P1C) are logically reconnected to each other. This reduces cases in which nodes are disconnected from predetermined nodes because of their logical disconnection. This provides a fail-safe function when a loop-connected bus cable is disconnected physically. As described above, the interface device of one embodiment shifts ports that are physically loop-connected to the low power consumption state and provides a fail-safe function when a loop-connected bus cable is physically disconnected.

(2) As the state of the state machines SM1 and SM2, one embodiment uses the Sleep1 state ST5 in which the Loop_disabled value is 1 in addition to the Sleep0 state ST2 in which the Loop_disabled value is 0. This enables the state machines SM1 and SM2 to distinguish the Sleep1 state from the Sleep0 state and shift from the Sleep1 state ST5 to the Loop_disabled state ST4. After the state machines SM1 and SM2 shift to the Loop_disabled state ST4, the state machines are simply required to shift to the Untested state ST3 based on the existing state shifting condition T5. This cancels the logical disconnection of the state machines. Thus, only when the bus cable is logically disconnected and the state machines shift to the low power consumption mode (Sleep1 state), the logical disconnection is cancelled and the bus cable is reconnected. Further, this eliminates the need for the state machines to shift from the Sleep1 state ST5 to the Untested state ST3 to perform speed negotiation after shifting to the Loop_disabled state ST4. As a result, the time required to reconnect the bus cable is shortened as compared with when the state machines shift from the Sleep0 state ST2 to the Untested state ST3 after shifting to the Disconnected state ST1. This enables predetermined nodes to quickly start transmitting and receiving data.

IDB-1394 requires state machines to automatically shift to the low power consumption state when the state machines continue to be in a physically disconnected state over a predetermined time. Thus, conventional state machines that do not refer to their loop disabled values fail to recognize whether the state machines have shifted to the low power consumption mode after shifting to the logically disconnected state or after shifting to the physically disconnected state.

Another embodiment will now be described with reference to FIGS. 8 and 9. In another embodiment, interface circuits 10A, 10B, and 10C have state shifting conditions that differ from the state shifting conditions of the interface circuits of one embodiment. The components of the interface circuits in another embodiment that are the same as the components shown in FIGS. 2 to 7 are denoted by the same reference numerals as those components and will not be described in detail.

Figure 8:
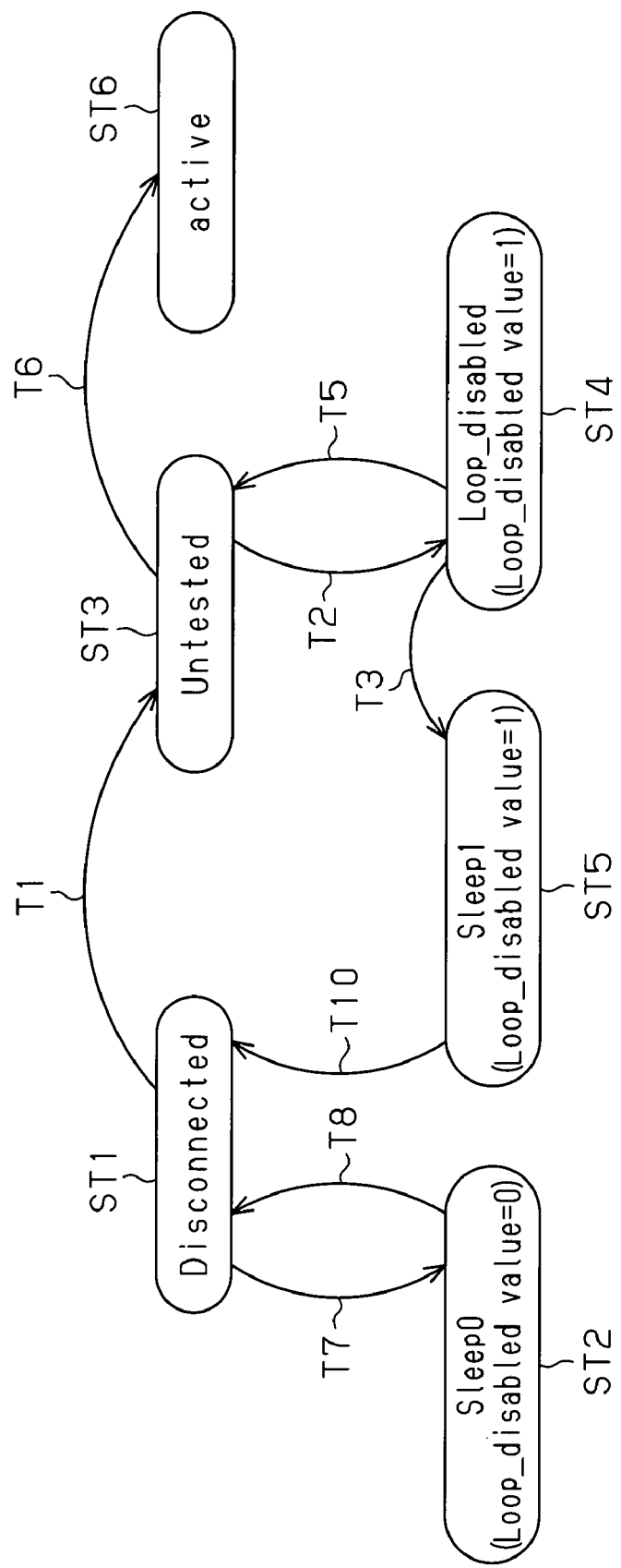
FIG. 8 is a diagram showing the shifting of states according to another embodiment.

FIG. 8 shows the shifting of states of a state machine SM1 included in the interface circuit 10A of another embodiment. The state machine SM1 shifts between states ST1 to ST6, which are the same as the states described in one embodiment.

The shifting of the state machine SM1 between the states ST1 to ST6 will now be described. State shifting conditions T1 to T3 and T5 to T8 are the same as the state shifting conditions described in one embodiment. If a bus reset is detected when the state machine SM1 is in the Sleep state ST5 (state shifting condition T10), the state machine SM1 shifts to the Disconnected state ST1.

In the same manner as in one embodiment, the interface circuits 10B and 10C of the nodes 2 and 3 have the same structure as the interface circuit 10A and will not be described.

The state shifting of the ports of each node will now be described with reference to FIG. 9.

In another embodiment, step S30 is executed in lieu of steps S22 and S25 described in one embodiment. The other steps are the same as the steps described in one embodiment.

In step S21, when a bus cable breaks or a bus cable is removed in the topology including ports connected to the state machines that are in the Sleep1 state (e.g., the second port P2B of the node 2 and the first port P1C of the node 3), the state machines detect a bus reset. In this case, the processing proceeds to step S30. In step S23, when a new physical connection occurs in the network system with the topology including ports connected to the state machines that are in the Sleep1 state (e.g., refer to FIG. 5C), the state machines detect a bus reset. In this case, the processing proceeds to step S30.

In step S30, the state machines in the Sleep1 state corresponding to the second port P2B of the node 2 and the first port P1C of the node 3 shift to the Disconnected state. These state machines reset the Loop_disabled values stored in their registers R to 0. The processing then proceeds to step S1. More specifically, if a bus reset is detected when the state machines (ports) are in the Sleep1 state ST5 (state shifting condition T10), the state machines that are in the Sleep1 state ST5 shift to the Disconnected state ST1 and reset the Loop_disabled values to 0. As a result, when, for example, the processing proceeds from step S21 to step S30, the logical disconnection of the bus cable 1c is cancelled as shown in FIG. 5E, and the second port P2B of the node 2 and the first port P1C of the node 3 are logically reconnected to each other. This prevents the node 3 from being disconnected from the nodes 1 and 2.

Another embodiment has the advantages described below.

(1) When a bus reset occurs, the state machines SM1 and SM2 shift from the Sleep1 state ST5 to the Disconnected state ST1. The state machines that have shifted to the Disconnected state ST1 shift to the Untested state ST3 based on the existing state shifting condition T1. This cancels the logical disconnection of the ports connected to the state machines. Accordingly, the state shifting conditions of another embodiment eliminate the need to switch off the power supply for automatic logical reconnection of the state machines (ports), which have once been shifted to the Sleep state, to shift the state machines to the Untested state ST3 in which the logical disconnection is cancelled. As a result, when, for example, a bus cable forming a loop is disconnected for one reason or another, the logical disconnection of the logically disconnected ports, which have been shifted to the Sleep1 state, is automatically cancelled. As a result, these ports (the ports P2B and P1C) are logically connected. This reduces nodes disconnected from predetermined nodes due to logical disconnection and provides a fail-safe function when a loop-connected bus cable is physically disconnected. As described above, the interface device of another embodiment shifts ports that are physically loop-connected to the low power consumption state while providing a fail-safe function when a loop-connected bus cable is physically disconnected.

(2) The state machines shift from the Sleep1 state ST5 to the Disconnected state ST1 instead of the Loop_disabled state ST4. The state shifting condition T8 for shifting from the Sleep0 state ST2 to the Disconnected state ST1 and the state shifting condition T10 for shifting from the Sleep1 state ST5 to the Disconnected state ST1 are the same state shifting conditions. This enables the state machines of the interface circuit of another embodiment to be compatible with state machines of the existing interface circuit (IDB-1394 interface circuit). Thus, the interface circuit of another embodiment is communicable with the existing interface circuit when connected to the existing interface circuit.

It should be apparent to those skilled in the art that the present invention may be embodied in many other specific forms without departing from the spirit or scope of the embodiments. Particularly, it should be understood that the embodiments may be embodied in the following forms. In the aforementioned embodiments, the number of nodes is not particularly limited. Further, the number of nodes that form a loop are also not limited, and four or more nodes may form a loop.

Although each interface circuit includes two ports in the aforementioned embodiments, each interface circuit may include one port or three or more ports.

Although the aforementioned embodiments describe cases in which the bus reset in step S21 occurs when a bus cable is physically disconnected, the present invention is not limited in such a manner. For example, the bus reset in step S21 may occur when just removing a bus cable.

In one embodiment, step S23 in the flowchart shown in FIG. 7 may be eliminated. More specifically, when a new connection is detected in the network system including the state machines (ports) in the Sleep0 state or the Sleep1 state, the state machines that are in the Sleep0 state or the Sleep1 state may always shift to the Disconnected state ST1. Alternatively, when a new physical connection is detected in the network system in step S20, the state machines (port) in the Sleep1 state may be prevented from shift their states.

In the aforementioned embodiments, the states of the state machines SM1 and SM2 are shifted based on the state shifting conditions. However, for example, the states of the ports may shift directly based on state shift signals output from the state machines SM1 and SM2.

Like IEEE-1394b, IDB-1394 also requires one of the bus cables forming a loop to be logically disconnected when such a physical loop connection is detected. To disconnect the bus cable, IDB-1394 first shifts the ports P2B and P1C to a Loop_disabled state in which the ports P2B and P1C exchange tone signals for recognizing the connection of the other port. Then, the ports P2B and P1C are shifted to a Sleep state in which even tone signals and not exchanged between each other. In comparison, IEEE-1394b only shifts the ports P2B and P1C to the Loop_disabled state. Thus, IDB-1394, which shifts from the Loop-disabled state to the Sleep state, consumes less power than IEEE-1394b.

Figure 1A:
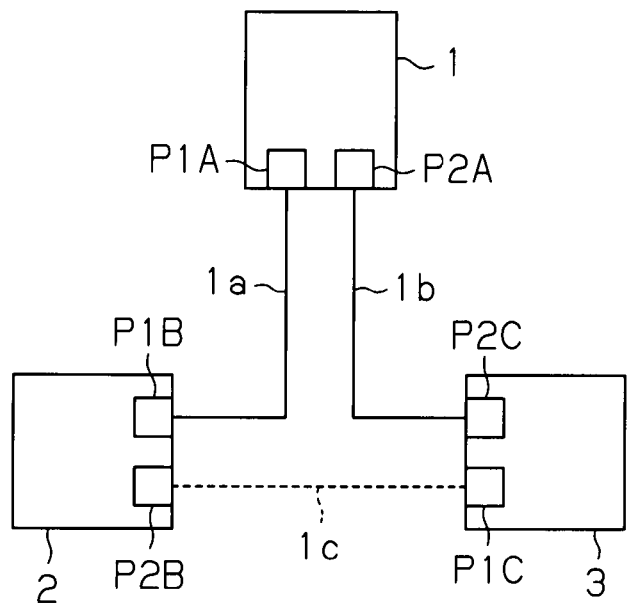
FIGS. 1A and 1B are block diagrams showing a network system in the prior art.
Figure 1B:
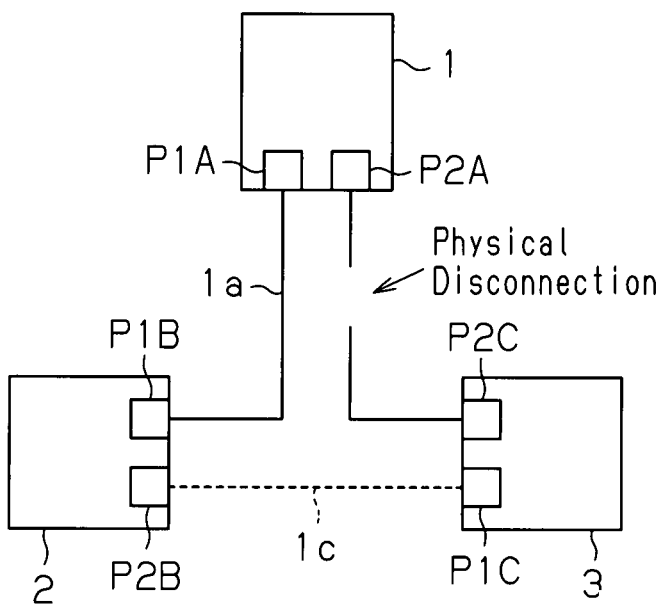

However, IDB-1394 has the following drawbacks. For example, as shown in the state of FIG. 1B, when the ports P2B and P1C are in the Sleep state, if a bus cable other than the bus cable 1c forming the loop becomes disconnected for one reason or another (the bus cable 1b is broken in the example of FIG. 1B), the bus cable 1c will remain logically disconnected from the node 3 even after a bus reset occurs. As a result, the node 3 will be disconnected from the network even though the bus cable 1c is physically connected to the port P1C.

IDB-1394 shifts the ports P2B and P1C to a data transfer preparation state if a bus reset occurs when the ports P2B and P1C are in the Loop_disabled state. Thus, the node 3 cannot be disconnected from the network.

To initialize the states of the ports of the nodes 1 to 3 when the node 3 is disconnected from the network, the power supply needs to be switched off and then switched on again. This logically reconnects the bus cable 1c. However, as described above, an automobile battery is used to supply power to the IDB-1394 interface. This makes it difficult to switch off the power supply and then switch on the power supply again.

In the aforementioned embodiments, when a loop is detected, the port that has been finally connected to form the loop is logically disconnected. Alternatively, for example, a port of a node with a low transfer speed may be logically disconnected. In this case, port information including the transfer speed of each port may be transmitted together with a test loop signal, and the port that is to be logically disconnected may be determined based on the port information.

The loop test is not limited to the loop test described in the aforementioned embodiments. For example, the loop test may use two different loop test signals.

Instead of arranging the analysis circuits 24a and 24b, the generation circuits 25a and 25b, and the port monitoring circuits 26a and 26b for the corresponding ports in each node, the ports of each node may commonly share these circuits.

The present examples and embodiments are to be considered as illustrative and not restrictive, and the invention is not to be limited to the details given herein, but may be modified within the scope and equivalence of the appended claims.

What is claimed is:

1. An interface device comprising:
    a plurality of ports connectable to a bus cable; and
    a plurality of state machines corresponding to the plurality of ports, wherein each of the state machines:
    logically disconnects the corresponding port from a network by shifting the corresponding port to a logically disconnected state in response to detection of a loop associated with the corresponding port and then shifts the corresponding port to a low power consumption state; and
    shifts the corresponding port from the low power consumption state to a non-low power consumption state while maintaining the corresponding port in a logically or physically disconnected state from the network when detecting a bus reset of the network during a period in which the corresponding port is in the low power consumption state.

2. The interface device according to claim 1, wherein the non-low power consumption state is a physically disconnected state in which the corresponding port is disconnected from the bus cable.

3. The interface device according to claim 1, wherein each of the state machines:
    sets a loop disabled value to a predetermined value when shifting the corresponding port to the logically disconnected state; and
    after setting the loop disabled value, shifts the corresponding port to the low power consumption state while maintaining the loop disabled value at the predetermined value.

4. The interface device according to claim 3, wherein each of the state machines shifts the corresponding port from the low power consumption state to the logically disconnected state when detecting that a shifting condition is satisfied in which the corresponding port is in the low power consumption state, the loop disabled value is set at a predetermined value, and the bus reset occurs in the network.

5. The interface device according to claim 1, wherein the bus reset occurs when a bus cable that is one of bus cables forming the loop and differs from a bus cable connected to a port in the logically disconnected state or in the low power consumption state is physically disconnected.

6. The interface device according to claim 1, wherein the interface device is in compliance with the IDB-1394 standard and incorporated in a node.

7. A method for forming a network topology, the method comprising:
- dissolving a loop formed by a plurality of ports that are in compliance with the IDB-1394 standard and are included in a plurality of nodes by shifting at least one of the ports to a logically disconnected state;
- shifting the at least one of the ports from the logically disconnected state to a low power consumption state after the loop is dissolved; and
- shifting the at least one of the ports from the low power consumption state to a non-low power consumption state while maintaining the corresponding port in a logically or physically disconnected state from the network topology when a bus reset occurs in the network topology during a period in which the at least one of the ports is in the low power consumption state.

8. The method according to claim 7, wherein the non-low power consumption state is a physically disconnected state in which the at least one of the ports is disconnected from the bus cable.

9. The method according to claim 7, further comprising:
- setting a loop disabled value to a predetermined value when shifting the at least one of the ports to the logically disconnected state; and
- after said setting a loop disabled value, shifting the at least one of the ports from the logically disconnected state to the low power consumption state while maintaining the loop disabled value at the predetermined value.

10. The method according to claim 9, further comprising:
- shifting the at least one of the ports from the low power consumption state to the logically disconnected state when detecting that a shifting condition is satisfied in which the at least one of the ports is in the low power consumption state, the loop disabled value is set at the predetermined value, and the bus reset occurs in the network topology.

11. The method according to claim 7, wherein the bus reset occurs when a bus cable that is one of bus cables forming the loop and differs from a bus cable connected to a port in the logically disconnected state or in the low power consumption state is physically disconnected.

12. A network device including the interface device according to claim 1.

* * * * *